(12) United States Patent
Chen et al.

(10) Patent No.: US 12,442,969 B2
(45) Date of Patent: Oct. 14, 2025

(54) LIGHT GUIDE MODULE

(71) Applicant: Chicony Power Technology Co., Ltd., New Taipei (TW)

(72) Inventors: Tsung-Hsun Chen, New Taipei (TW); Hsuan-Wei Ho, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/657,134

(22) Filed: May 7, 2024

(65) Prior Publication Data

US 2025/0251540 A1    Aug. 7, 2025

(30) Foreign Application Priority Data

Feb. 1, 2024  (TW) .................................. 113104069

(51) Int. Cl.
*F21V 8/00* (2006.01)

(52) U.S. Cl.
CPC .......... *G02B 6/0031* (2013.01); *G02B 6/0068* (2013.01); *G02B 6/0083* (2013.01)

(58) Field of Classification Search
CPC ... G02B 6/0083; G02B 6/0068; G02B 6/0031
See application file for complete search history.

(56) References Cited

U.S. PATENT DOCUMENTS

| | | | | |
|---|---|---|---|---|
| 11,587,745 B1* | 2/2023 | Lien | ...................... | G06F 3/0202 |
| 11,914,185 B1* | 2/2024 | Chen | ...................... | H01H 13/14 |
| 12,019,261 B2* | 6/2024 | Chen | ...................... | G02B 6/0031 |
| 2016/0139317 A1* | 5/2016 | Tai | ...................... | G02B 6/0021 362/628 |
| 2020/0043681 A1* | 2/2020 | Chen | ...................... | G06F 3/0213 |
| 2021/0055607 A1 | 2/2021 | Lee et al. | | |
| 2022/0099883 A1* | 3/2022 | Taguchi | ............... | G02B 6/0021 |
| 2023/0258855 A1* | 8/2023 | Hsu | ...................... | G02B 6/0036 362/97.1 |
| 2025/0085589 A1* | 3/2025 | Niimi | ............... | G02F 1/133612 |

FOREIGN PATENT DOCUMENTS

| | | |
|---|---|---|
| CN | 1564066 A | 1/2005 |
| CN | 102903837 A | 1/2013 |
| CN | 114256017 A | 3/2022 |
| CN | 217544435 U | 10/2022 |

(Continued)

*Primary Examiner* — Zheng Song
(74) *Attorney, Agent, or Firm* — Birch, Stewart, Kolasch & Birch, LLP

(57) ABSTRACT

A light guide module includes a circuit board, a light emitting unit, a light guide plate, and a film. The light emitting unit includes a first light emitting unit and a second light emitting unit. The first light emitting unit and the second light emitting unit are arranged on the circuit board along a first axis. The light emitting unit has a second axis, and the second axis is substantially perpendicular to the first axis. The light guide plate has a through hole and a light conducting area. The through hole is surrounded by a hole wall. There is a first gap between the first light emitting unit and the adjacent hole wall along the first axis, and there is a second gap between the first light emitting unit and the adjacent hole wall along the second axis. The first gap is larger than the second gap.

18 Claims, 20 Drawing Sheets

(56) References Cited

FOREIGN PATENT DOCUMENTS

| TW | 201814922 A | 4/2018 |
|---|---|---|
| TW | 201907428 A | 2/2019 |
| TW | I689959 B | 4/2020 |
| TW | I697021 B | 6/2020 |
| TW | I742907 B | 10/2021 |
| TW | 202211277 A | 3/2022 |
| TW | I780860 B | 10/2022 |

* cited by examiner

LIGHT GUIDE MODULE

CROSS-REFERENCE TO RELATED APPLICATION

This non-provisional application claims priority under 35 U.S.C. § 119(a) to Patent Application No. 113104069 filed in Taiwan, R.O.C. on Feb. 1, 2024, the entire contents of which are hereby incorporated by reference.

BACKGROUND

Technical Field

The disclosure relates to a light guide module, and in particular, to a light guide module that alleviates a heterochromatic problem.

Related Art

In recent years, to meet a thinning requirement, a light guide module, formed by a circuit board, a light emitting unit, a light guide plate, and a film, may be thinned to 0.4 mm in thickness. However, in an RGB LED, three units (red unit, green unit, and blue unit) are arranged side by side, and single color intensity on both left and right sides is strong. When light enters the light guide plate, an obvious heterochromatic problem exists.

SUMMARY

In view of the foregoing content, in some embodiments, a light guide module includes a circuit board, a light emitting unit, a light guide plate, and a film. The light emitting unit includes a first light emitting unit and a second light emitting unit. The first light emitting unit and the second light emitting unit are arranged on the circuit board along a first axis. The light emitting unit has a second axis, and the second axis is substantially perpendicular to the first axis. The light guide plate has a through hole and a light conducting area. The through hole is surrounded by a hole wall. The light guide plate is located on the circuit board and the light emitting unit is located in the through hole. There is a first gap between the first light emitting unit and the adjacent hole wall along the first axis, and there is a second gap between the first light emitting unit and the adjacent hole wall along the second axis. The first gap is larger than the second gap. The film has a light transmitting area and a light adjusting portion, and the light adjusting portion is located in the light transmitting area. The light conducting area corresponds to the light transmitting area, and the through hole corresponds to the light adjusting portion.

In some embodiments, the light adjusting portion includes a first light shielding area and a light reflecting area. The light reflecting area corresponds to the light emitting unit and the second gap, and the first light shielding area corresponds to the first gap.

In some embodiments, the light emitting unit further includes a third light emitting unit. The first light emitting unit, the third light emitting unit, and the second light emitting unit are sequentially arranged along the first axis. There is a third gap between the second light emitting unit and the adjacent hole wall along the first axis, and there is a fourth gap between the second light emitting unit and the adjacent hole wall along the second axis. The third gap is larger than the fourth gap. The light adjusting portion further includes a second light shielding area, the second light shielding area corresponds to the third gap, and the light reflecting area further corresponds to the fourth gap.

In some embodiments, the light guide module further includes a reflection portion, a first light absorption area, and a second light absorption area. The reflection portion is arranged between the light guide plate and the circuit board. The first light absorption area and the second light absorption area are arranged on the circuit board. The first light absorption area corresponds to the first gap.

In some embodiments, the light guide module further includes a reflection portion, a first light absorption area, and a second light absorption area. The reflection portion is arranged between the light guide plate and the circuit board. The first light absorption area and the second light absorption area are a part of the circuit board. The first light absorption area corresponds to the first gap.

In some embodiments, the light conducting area includes a first sub-light conducting area and a third sub-light conducting area. The first light absorption area further corresponds to the first sub-light conducting area adjacent to the first gap.

In some embodiments, the light guide module further includes an upper adhesion member. The upper adhesion member is arranged on the light guide plate and arranged around the light emitting unit. The upper adhesion member corresponds to the first gap and the third gap.

In some embodiments, the light conducting area includes a first sub-light conducting area and a third sub-light conducting area. The upper adhesion member further corresponds to the first sub-light conducting area adjacent to the first gap and the third sub-light conducting area adjacent to the third gap.

In some embodiments, the upper adhesion member further corresponds to the second gap and the fourth gap.

In some embodiments, the light guide module further includes a lower adhesion member. The lower adhesion member is arranged under the light guide plate and arranged around the light emitting unit. The lower adhesion member corresponds to the first gap and the third gap.

In some embodiments, the upper adhesion member and the lower adhesion member continuously or discontinuously surround the light emitting unit.

In some embodiments, on the second axis, the light conducting area around the through hole includes a second sub-light conducting area and a fourth sub-light conducting area. A microstructure area is arranged on the second sub-light conducting area adjacent to the second gap and the fourth sub-light conducting area adjacent to the fourth gap.

In some embodiments, a light guide module includes a circuit board, a first light emitting unit, a second light emitting unit, a light guide plate, and a film. The first light emitting unit includes a first light emitting unit and a second light emitting unit. The first light emitting unit and the second light emitting unit are arranged on the circuit board along a first axis. The first light emitting unit has a second axis, and the second axis is substantially perpendicular to the first axis. The second light emitting unit includes a fourth light emitting unit and a fifth light emitting unit. The fourth light emitting unit and the fifth light emitting unit are arranged on the circuit board along a third axis. The second light emitting unit has a fourth axis, and the fourth axis is substantially perpendicular to the third axis. The light guide plate has a first through hole, a second through hole, and a light conducting area. The first through hole is surrounded by a first hole wall, and the second through hole is surrounded by a second hole wall. The light guide plate is located on the circuit board and the first light emitting unit is located in the first through hole. There is a first gap between the first light emitting unit and the adjacent first hole wall along the first axis, and there is a second gap between the first light emitting unit and the adjacent first hole wall along the second axis. The first gap is larger than the second gap. The second light emitting unit is located in the second through hole. There is a fifth gap between the fourth light emitting unit and the adjacent second hole wall along the third axis, and there is a sixth gap between the fourth light emitting unit and the adjacent second hole wall along the fourth axis. The fifth gap is larger than the sixth gap. The film has a light transmitting area, a first light adjusting portion, and a second light adjusting portion. The first light adjusting portion and the second light adjusting portion are located in the light transmitting area. The light conducting area corresponds to the light transmitting area, the first through hole corresponds to the first light adjusting portion, and the second through hole corresponds to the second light adjusting portion.

In some embodiments, the first light adjusting portion includes a first light shielding area and a first light reflecting area. The first light reflecting area corresponds to the first light emitting unit and the second gap, and the first light shielding area corresponds to the first gap.

In some embodiments, the first light emitting unit further includes a third light emitting unit. The first light emitting unit, the third light emitting unit, and the second light emitting unit are sequentially arranged along the first axis. There is a third gap between the second light emitting unit and the adjacent first hole wall along the first axis, and there is a fourth gap between the second light emitting unit and the adjacent first hole wall along the second axis. The third gap is larger than the fourth gap. The first light adjusting portion further includes a second light shielding area, the second light shielding area corresponds to the third gap, and the first light reflecting area further corresponds to the fourth gap.

In some embodiments, a long side length of the film is greater than a short side length of the film, and the first axis of the first light emitting unit is perpendicular to the third axis of the second light emitting unit.

In some embodiments, a long side length of the film is greater than a short side length of the film, the first axis of the first light emitting unit is parallel to the third axis of the second light emitting unit, and the second axis of the first light emitting unit is parallel to and does not overlap the fourth axis of the second light emitting unit.

In some embodiments, the second through hole is L-shaped.

In some embodiments, a long side length of the film is greater than four times a short side length of the film, and the first axis of the first light emitting unit overlaps the third axis of the second light emitting unit.

Therefore, according to some embodiments, in a light guide module, a distance for emitting light from both left and right sides of a light emitting unit to a light guide plate on a first axis is increased, to weaken optical coupling efficiency, and avoid high monochrome light energy on both the left and right sides, thereby alleviating a heterochromatic problem and improving a light uniformity.

DETAILED DESCRIPTION

A term "heterochromia" described in some embodiments of the disclosure refers to a situation in which a color displayed on a light guide plate is uneven.

According to some embodiments, a light guide module may be used in various electronic products, to alleviate heterochromia. In some embodiments, the light guide module is used in a keyboard.

Figure 1:
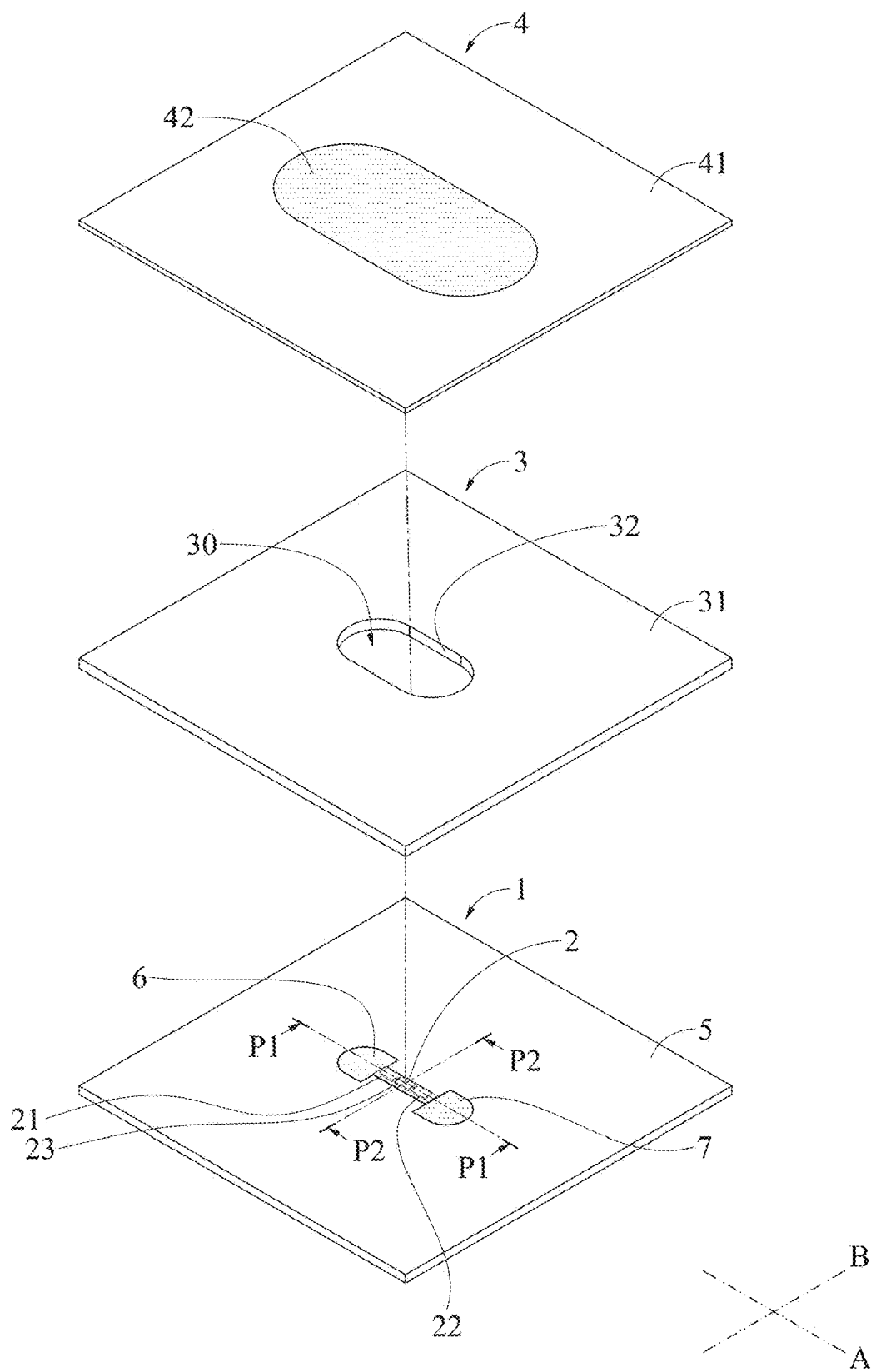
FIG. 1 is a schematic front three-dimensional exploded view of a first embodiment of a light guide module.

Refer to FIG. 1. FIG. 1 is a schematic front three-dimensional exploded view of a first embodiment of a light guide module 100. The light guide module 100 includes a circuit board 1, a light emitting unit 2, a light guide plate 3, and a film 4. The light emitting unit 2 includes a first light emitting unit 21 and a second light emitting unit 22. The first light emitting unit 21 and the second light emitting unit 22 are arranged on the circuit board 1 along an axis A. The light emitting unit 2 has an axis B, and the axis B is substantially perpendicular to the axis A. The light guide plate 3 has a through hole 30 and a light conducting area 31. The through hole 30 is surrounded by a hole wall 32. The light guide plate 3 is located on the circuit board 1 and the light emitting unit 2 is located in the through hole 30. The film 4 has a light transmitting area 41 and a light adjusting portion 42. The light adjusting portion 42 is located in the light transmitting area 41. The light conducting area 31 corresponds to the light transmitting area 41, and the through hole 30 corresponds to the light adjusting portion 42. In some embodiments, both the axis A and the axis B pass through the light emitting unit 2.

Refer to FIG. 1. In some embodiments, the light emitting unit 2 further includes a third light emitting unit 23. The first light emitting unit 21, the third light emitting unit 23, and the second light emitting unit 22 are sequentially arranged along the axis A.

Refer to FIG. 1. In some embodiments, the light emitting unit 2 is an RGB LED. In some embodiments, the first light emitting unit 21, the third light emitting unit 23, and the second light emitting unit 22 are sequentially a red unit, a green unit, and a blue unit, but are not limited thereto. In some other embodiments, the first light emitting unit 21, the third light emitting unit 23, and the second light emitting unit 22 are sequentially a blue unit, a green unit, and a red unit.

Refer to FIG. 1. In some embodiments, a size of the light emitting unit 2 is 1.3 mm*0.44 mm*0.23 mm.

Refer to FIG. 1. In some embodiments, a shape of the through hole 30 is not limited, and may be square, round, elliptical, or irregular.

Refer to FIG. 1. In some embodiments, the film 4 is a polyester film (Mylar).

Refer to FIG. 1. In some embodiments, the circuit board 1 is a flexible printed circuit (FPC).

Refer to FIG. 1. In some embodiments, the light guide plate 3 is PMMA (poly methyl methacrylate).

Figure 2:
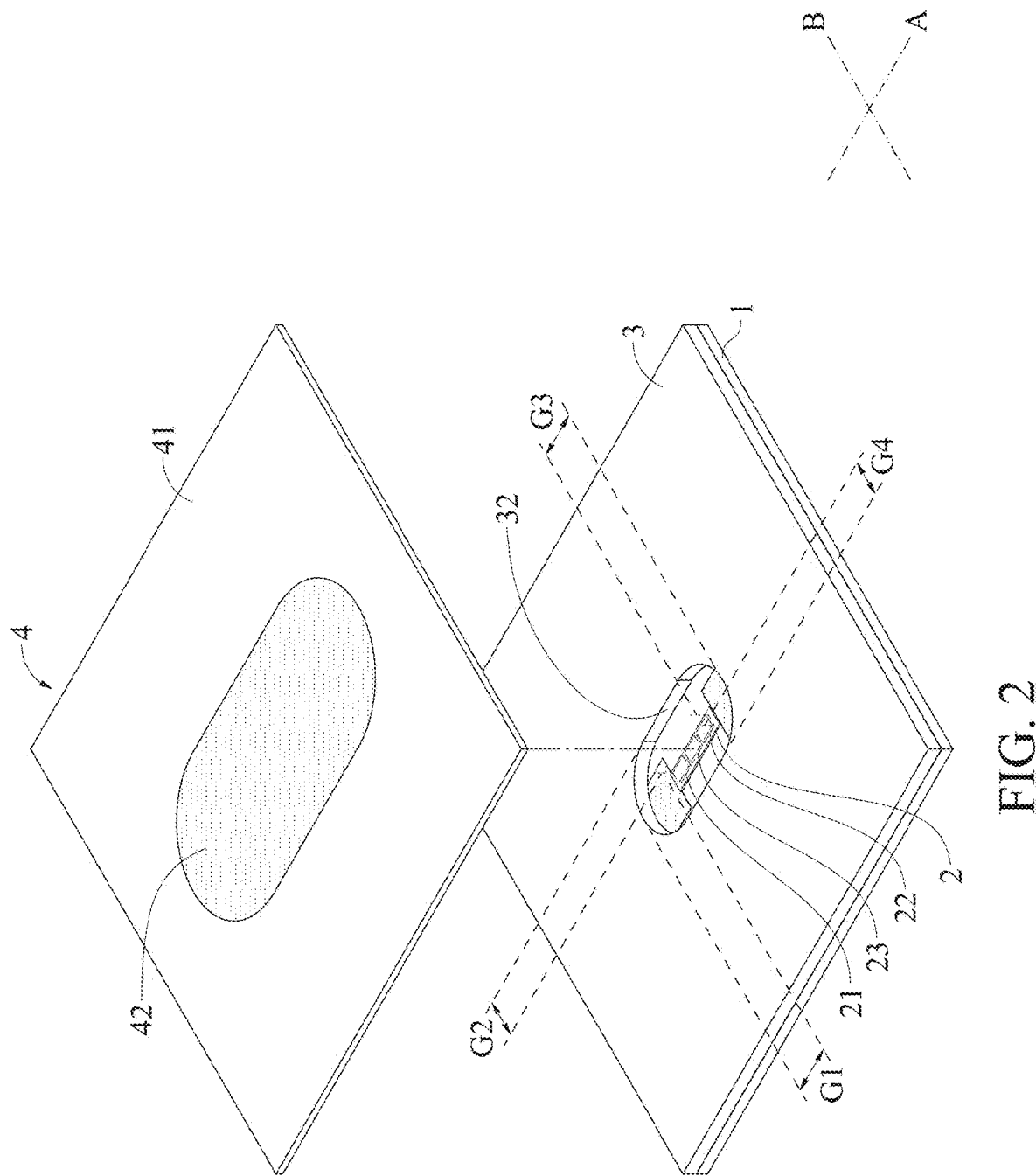
FIG. 2 is a schematic partial front three-dimensional exploded view of a first embodiment of a light guide module.

Refer to FIG. 2. FIG. 2 is a schematic partial front three-dimensional exploded view of the first embodiment of the light guide module 100. There is a first gap G1 between the first light emitting unit 21 and the adjacent hole wall 32 along the axis A, and there is a second gap G2 between the first light emitting unit 21 and the adjacent hole wall 32 along the axis B. The first gap G1 is larger than the second gap G2. In some embodiments, a distance of the first gap G1 is more than twice a distance of the second gap G2. In some embodiments, the distance of the first gap G1 is 1 mm and the distance of the second gap G2 is 0.35 mm. A distance for emitting light from both left and right sides of the light emitting unit 2 to the light guide plate 3 is increased, to weaken optical coupling efficiency, and avoid high monochrome light energy on both the left and right sides, thereby significantly alleviating a heterochromatic effect.

Refer to FIG. 2. In some embodiments, there is a third gap G3 between the second light emitting unit 22 and the adjacent hole wall 32 along the axis A, and there is a fourth gap G4 between the second light emitting unit 22 and the adjacent hole wall 32 along the axis B. The third gap G3 is larger than the fourth gap G4.

Refer to FIG. 2. In some embodiments, a distance of the third gap G3 is the same as the distance of the first gap G1, and the distance of the second gap G2 is the same as a distance of the fourth gap G4.

Figure 3:
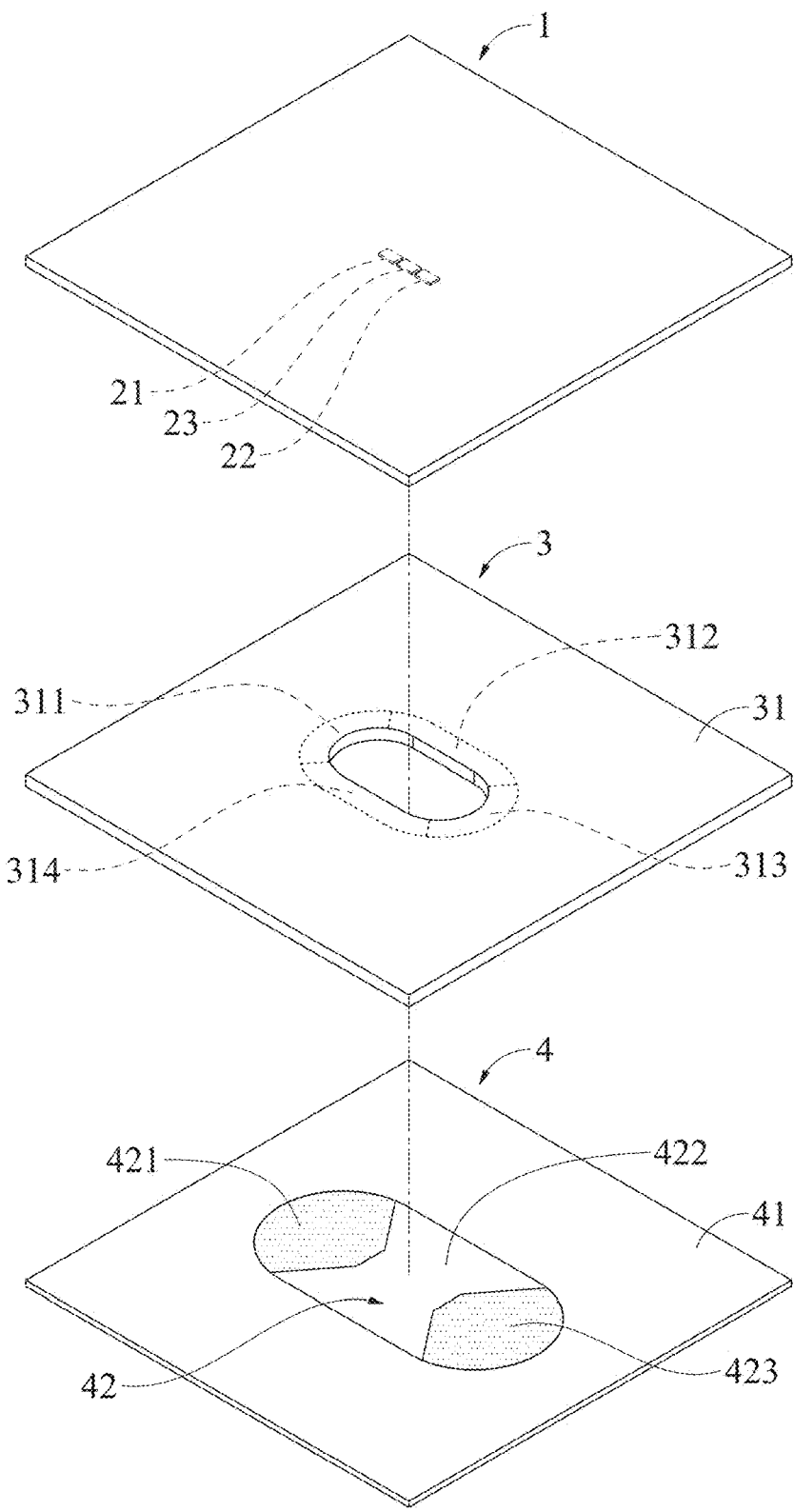
FIG. 3 is a schematic back three-dimensional exploded view of a first embodiment of a light guide module.
Figure 4:
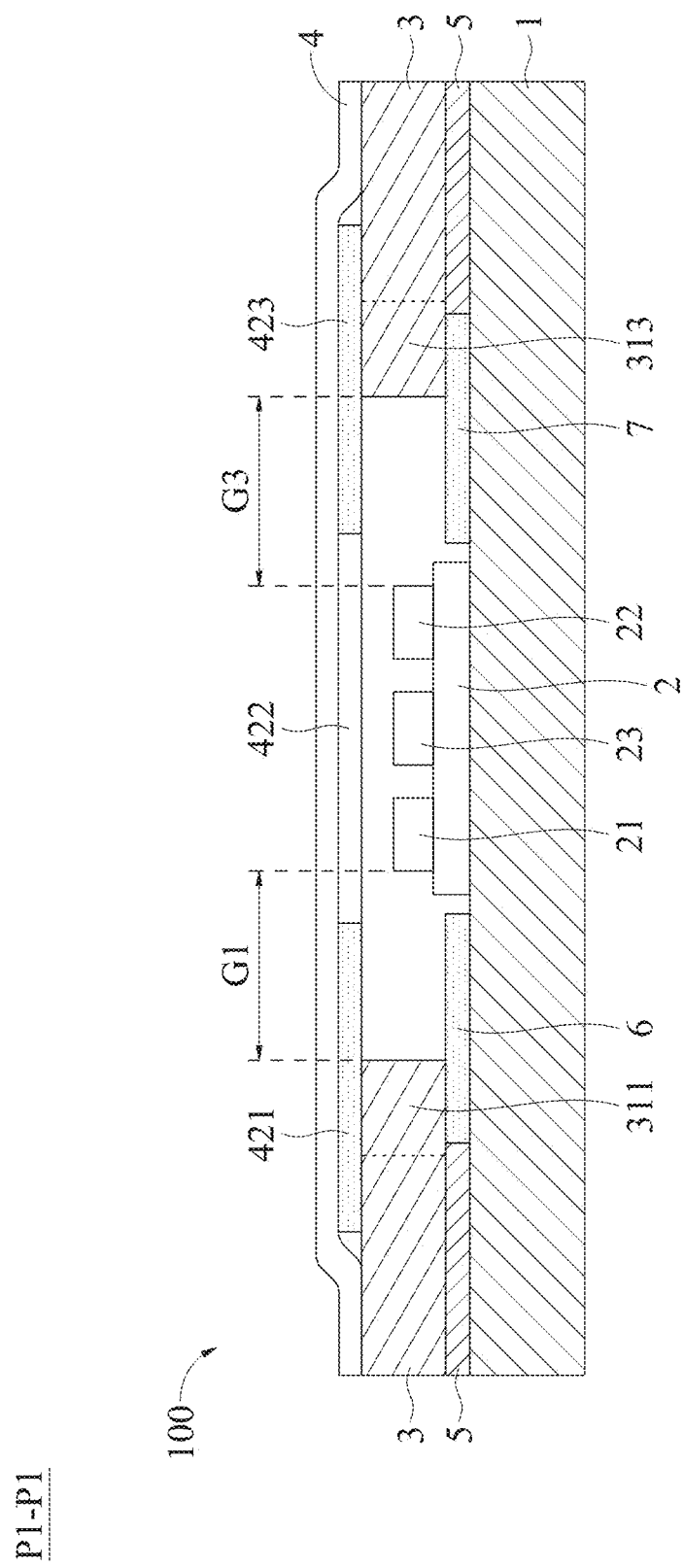
FIG. 4 is a schematic sectional view of a first embodiment of a light guide module in a direction of a sectional line P1-P1.
Figure 5:
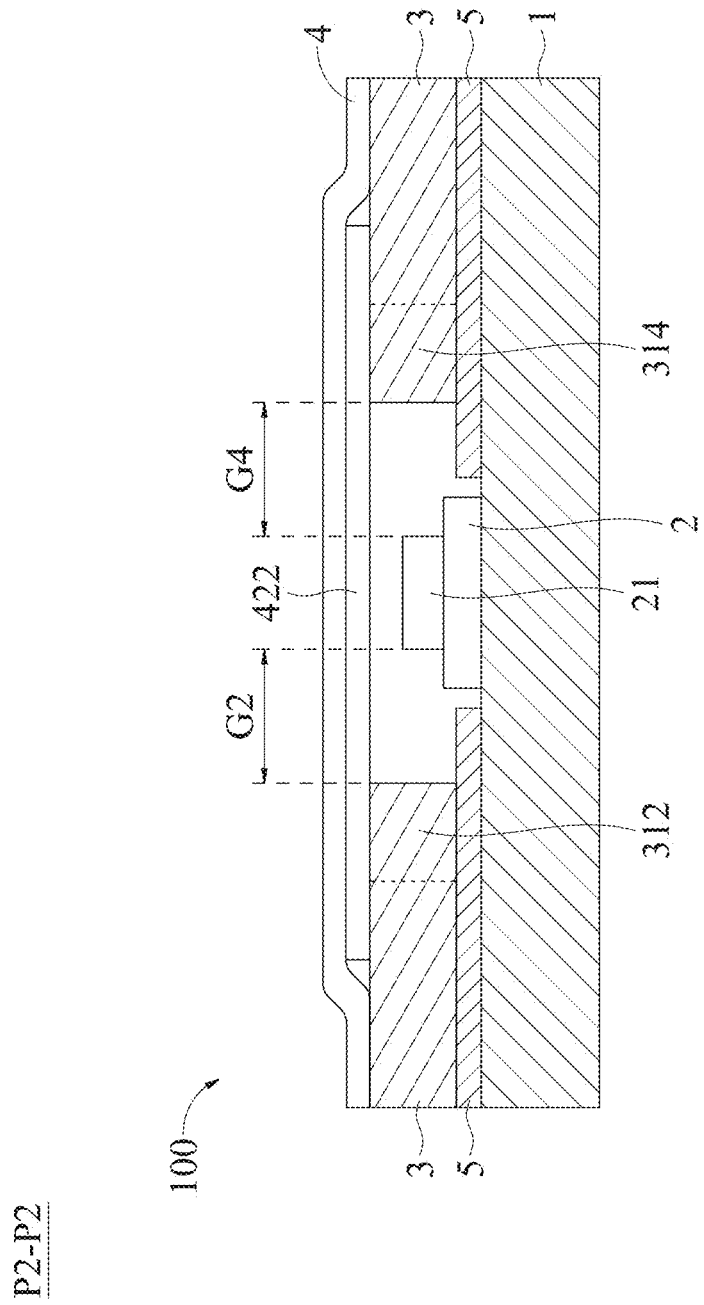
FIG. 5 is a schematic sectional view of a first embodiment of a light guide module in a direction of a sectional line P2-P2.

Refer to FIG. 3. FIG. 3 is a schematic back three-dimensional exploded view of the first embodiment of the light guide module 100. The light adjusting portion 42 includes a first light shielding area 421 and a light reflecting area 422. In addition, refer to FIG. 4 and FIG. 5 together. FIG. 4 and FIG. 5 are schematic sectional views of the first embodiment of the light guide module 100 in a direction of a sectional line P1-P1 and in a direction of a sectional line P2-P2. The light reflecting area 422 corresponds to the light emitting unit 2 and the second gap G2, and the first light shielding area 421 corresponds to the first gap G1. The first light shielding area 421 absorbs monochrome light emitted from a left side of the light emitting unit 2 to the light guide plate 3, so that the heterochromatic effect is further significantly alleviated. In addition, the light reflecting area 422 reflects white light of the light emitting unit 2, so that the white light enters the light guide plate 3 to improve light efficiency.

Refer to FIG. 3 and FIG. 4. In some embodiments, the light adjusting portion 42 further includes a second light shielding area 423, the second light shielding area 423 corresponds to the third gap G3, and the light reflecting area 422 further corresponds to the fourth gap G4. The second light shielding area 423 absorbs monochrome light emitted from a right side of the light emitting unit 2 to the light guide plate 3, so that the heterochromatic effect is further significantly alleviated.

In other words, in some embodiments, the light adjusting portion 42 includes the first light shielding area 421, the light reflecting area 422, and the second light shielding area 423. The light reflecting area 422 corresponds to the light emitting unit 2, the second gap G2, and the fourth gap G4. The first light shielding area 421 corresponds to the first gap G1. Also, the second light shielding area 423 corresponds to the third gap G3.

Refer to FIG. 3 to FIG. 5. In some embodiments, the light conducting area 31 includes a first sub-light conducting area 311, a second sub-light conducting area 312, a third sub-light conducting area 313, and a fourth sub-light conducting area 314. The first sub-light conducting area 311 is adjacent to the first gap G1, the second sub-light conducting area 312 is adjacent to the second gap G2, the third sub-light conducting area 313 is adjacent to the third gap G3, and the fourth sub-light conducting area 314 is adjacent to the fourth gap G4. The light reflecting area 422 further corresponds to the second sub-light conducting area 312 adjacent to the second gap G2 and the fourth sub-light conducting area 314 adjacent to the fourth gap G4. The first light shielding area 421 further corresponds to the first sub-light conducting area 311 adjacent to the first gap G1. The second light shielding area 423 further corresponds to the third sub-light conducting area 313 adjacent to the third gap G3.

In other words, in some embodiments, the light adjusting portion 42 includes the first light shielding area 421, the light reflecting area 422, and the second light shielding area 423. The light reflecting area 422 corresponds to the light emitting unit 2, the second gap G2, the second sub-light conducting area 312, the fourth gap G4, and the fourth sub-light conducting area 314. The first light shielding area 421 corresponds to the first gap G1 and the first sub-light conducting area 311. Also, the second light shielding area 423 corresponds to the third gap G3 and the third sub-light conducting area 313.

Refer to FIG. 4. In some embodiments, the first light shielding area 421 and the second light shielding area 423 are black coating layers. In some embodiments, the light reflecting area 422 is a white or silver coating layer. In some embodiments, the light reflecting area 422 is the white coating layer.

Refer to FIG. 1. In some embodiments, the light guide module 100 further includes a reflection portion 5, a first light absorption area 6, and a second light absorption area 7. In some embodiments, reflectivity of the first light absorption area 6 and reflectivity of the second light absorption area 7 are less than reflectivity of the reflection portion 5.

Figure 6:
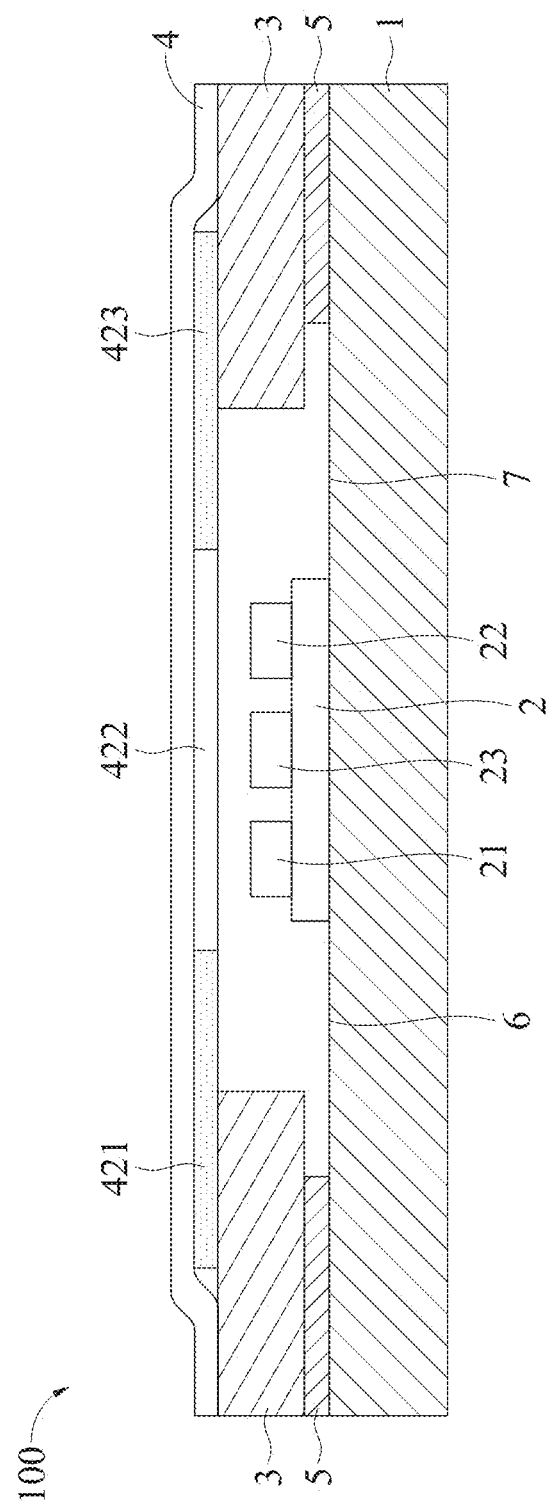
FIG. 6 is a schematic sectional view of a second embodiment of a light guide module.

In addition, refer to FIG. 4. In some embodiments, the reflection portion 5 is arranged between the light guide plate 3 and the circuit board 1. The first light absorption area 6 and the second light absorption area 7 are arranged on the circuit board 1. Refer to FIG. 6. FIG. 6 is a schematic sectional view of a second embodiment of the light guide module 100. In some other embodiments, a first light absorption area 6 and a second light absorption area 7 are a part of the circuit board 1.

Refer to FIG. 4. In some embodiments, the reflection portion 5, the first light absorption area 6, and the second light absorption area 7 are respectively arranged on the circuit board 1 of the light guide module 100. In some other embodiments, the reflection portion 5 is firstly arranged on the circuit board 1 of the light guide module 100, and then the first light absorption area 6 and the second light absorption area 7 are arranged on the reflection portion 5 (not shown in the figure). In some embodiments, the first light absorption area 6 and the second light absorption area 7 are black coating layers arranged on the circuit board 1. In some embodiments, the reflection portion 5 is a white or silver coating layer arranged on the circuit board 1. In some embodiments, the reflection portion 5 is the white coating layer.

Refer to FIG. 6. In some other embodiments, the circuit board 1 of the light guide module 100 includes at least a copper layer and a cover layer covering the copper layer (not shown in the figure). The reflection portion 5 is arranged on the circuit board 1 of the light guide module 100, and the first light absorption area 6 and the second light absorption area 7 are a part of the copper layer not covered by the cover layer and on which the reflection portion 5 is not arranged. In some embodiments, the cover layer is a polyimide (PI) layer.

Refer to FIG. 4. In some embodiments, the first light absorption area 6 corresponds to the first gap G1. In some embodiments, the first light absorption area 6 further corresponds to the first sub-light conducting area 311 adjacent to the first gap G1. In some embodiments, the second light absorption area 7 corresponds to the third gap G3. In some embodiments, the second light absorption area 7 further corresponds to the third sub-light conducting area 313 adjacent to the third gap G3. The first light absorption area 6 and the second light absorption area 7 absorb monochrome light emitted from both the left and right sides of the light emitting unit 2 to the light guide plate 3, so that the heterochromatic effect is further significantly alleviated.

Refer to FIG. 5. In some embodiments, the reflection portion 5 corresponds to the second sub-light conducting area 312 adjacent to the second gap G2 and the fourth sub-light conducting area 314 adjacent to the fourth gap G4. In some embodiments, the reflection portion 5 further corresponds to the second gap G2 and the fourth gap G4. The reflection portion 5 reflects light emitted from the light emitting unit 2 to the light guide plate 3, so that light energy is retained in the light guide plate 3, thereby reducing an energy loss of the light.

Figure 7:
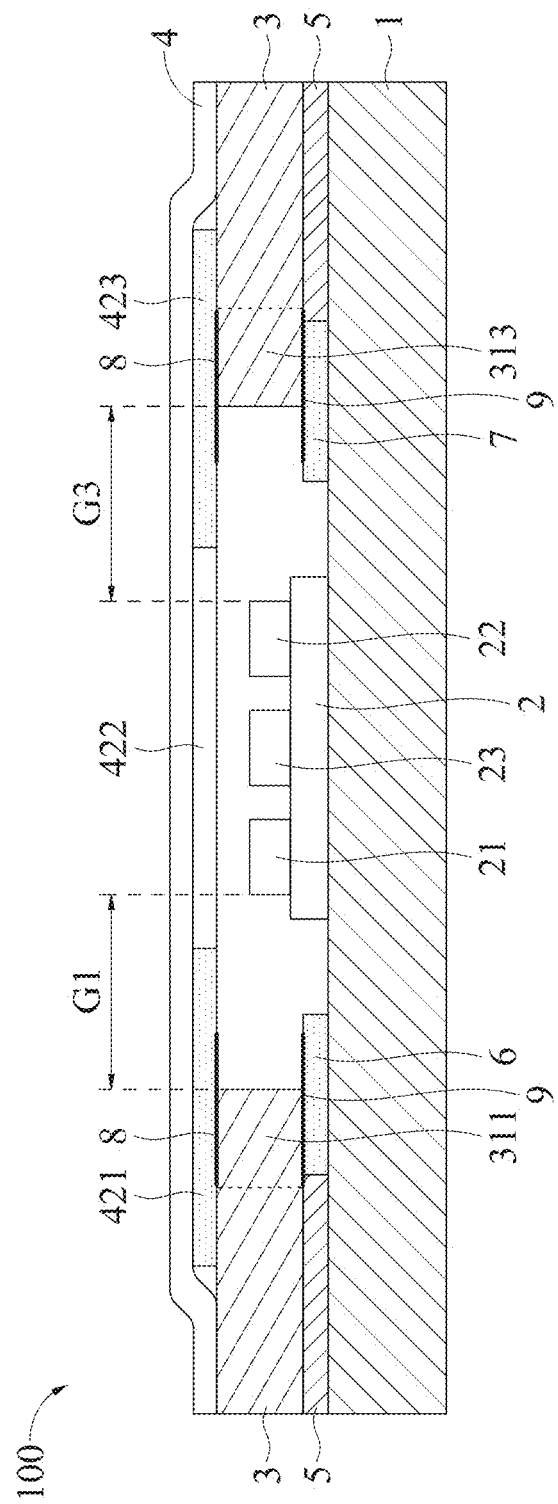
FIG. 7 is a schematic sectional view of a third embodiment of alight guide module.

Refer to FIG. 7. FIG. 7 is a schematic sectional view of a third embodiment of the light guide module 100. In some embodiments, the light guide module 100 further includes an upper adhesion member 8. The upper adhesion member 8 is arranged on the light guide plate 3 and arranged around the light emitting unit 2. In some embodiments, the light guide module 100 further includes a lower adhesion member 9. The lower adhesion member 9 is arranged under the light guide plate 3 and arranged around the light emitting unit 2. In some embodiments, there is a gap between the upper adhesion member 8 and the light emitting unit 2, and/or a gap between the lower adhesion member 9 and the light emitting unit 2.

Figure 8:
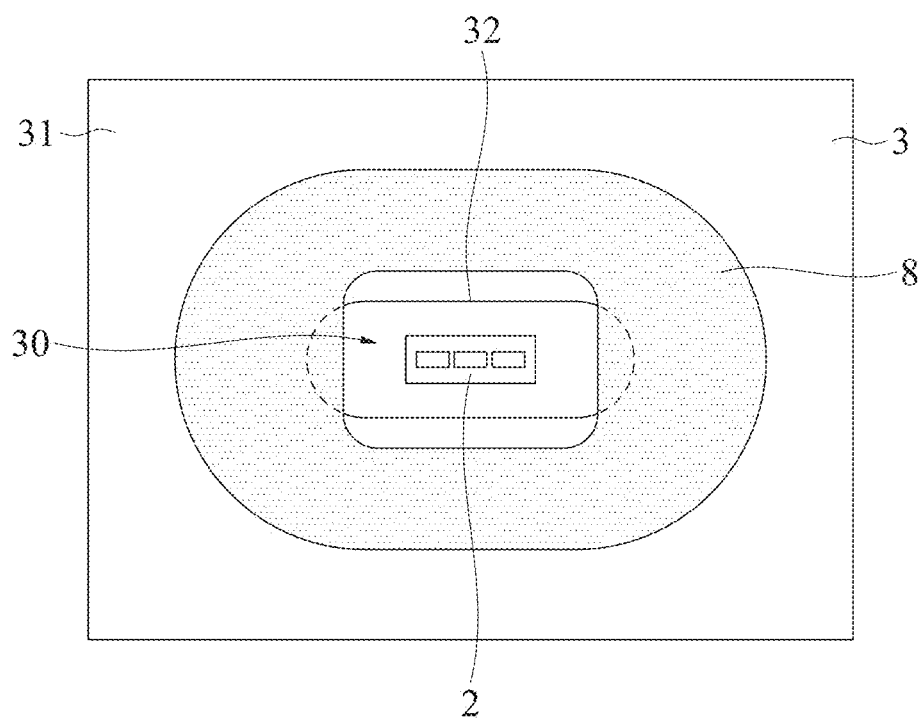
FIG. 8 is a schematic top view of a third embodiment of an upper adhesion member, a light guide plate, and a light emitting unit.

Refer to FIG. 7. In some embodiments, the upper adhesion member 8 corresponds to the first gap G1 and the third gap G3. In some embodiments, the upper adhesion member 8 further corresponds to the first sub-light conducting area 311 adjacent to the first gap G1 and the third sub-light conducting area 313 adjacent to the third gap G3. In some embodiments, the lower adhesion member 9 corresponds to the first gap G1 and the third gap G3. In some embodiments, the lower adhesion member 9 further corresponds to the first sub-light conducting area 311 adjacent to the first gap G1 and the third sub-light conducting area 313 adjacent to the third gap G3. Refer to FIG. 8. FIG. 8 is a schematic top view of the third embodiment of the upper adhesion member 8, the light guide plate 3, and the light emitting unit 2. In some embodiments, the upper adhesion member 8 and the lower adhesion member 9 continuously surround the light emitting unit 2, but are not limited thereto. In some other embodiments, the upper adhesion member 8 and the lower adhesion member 9 discontinuously surround the light emitting unit 2. The upper adhesion member 8 and the lower adhesion member 9 are close to both the left and right sides of the light emitting unit 2 (on the axis A), so that monochrome light enters the upper adhesion member 8 and the lower adhesion member 9, so that the monochrome light enters the first light shielding area 421 or the second light shielding area 423 of the film 4, and enters the first light absorption area 6 or the second light absorption area 7 (also referring to FIG. 7). Therefore, a quantity of light emitted from both the left and right sides of the light emitting unit 2 and an optical coupling effect are weakened, thereby significantly alleviating the heterochromatic effect.

Figure 9:
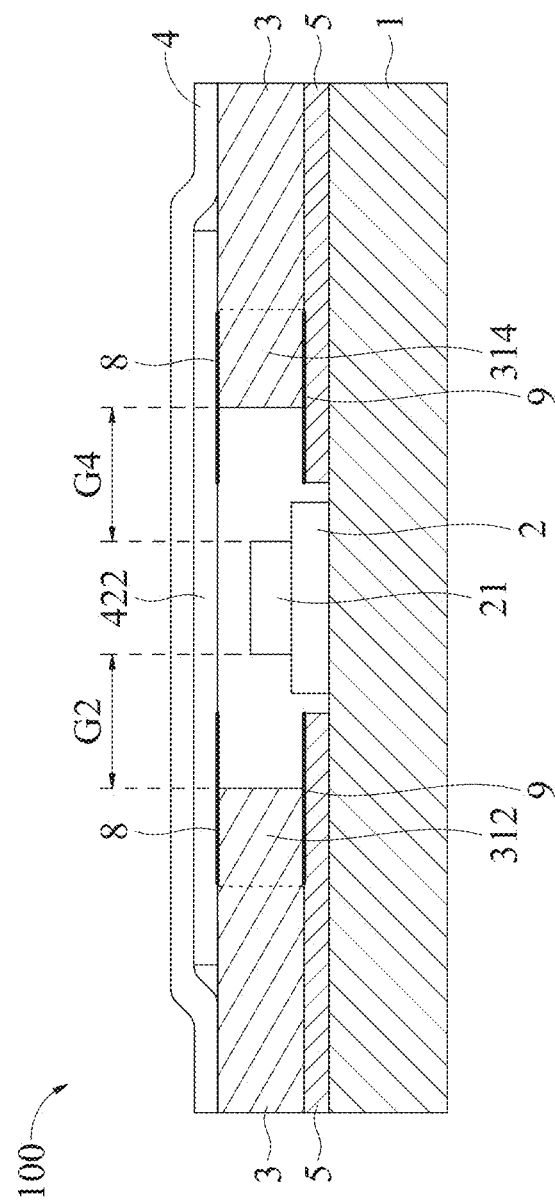
FIG. 9 is a schematic sectional view of a fourth embodiment of a light guide module.
Figure 10:
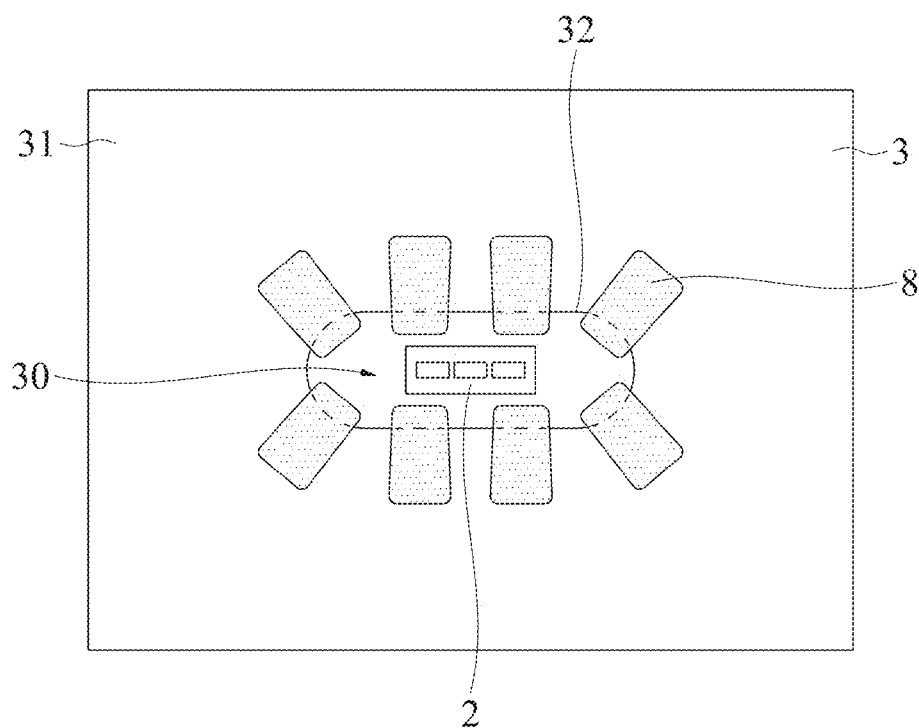
FIG. 10 is a schematic top view of a fourth embodiment of an upper adhesion member, a light guide plate, and a light emitting unit.

Refer to FIG. 9. FIG. 9 is a schematic sectional view of a fourth embodiment of the light guide module 100. In some embodiments, the upper adhesion member 8 further corresponds to the second gap G2 and the fourth gap G4, and the lower adhesion member 9 further corresponds to the second gap G2 and the fourth gap G4. In some embodiments, the upper adhesion member 8 further corresponds to the second sub-light conducting area 312 adjacent to second gap G2 and the fourth sub-light conducting area 314 adjacent to the fourth gap G4, and the lower adhesion member 9 further corresponds to the second sub-light conducting area 312 adjacent to the second gap G2 and the fourth sub-light conducting area 314 adjacent to the fourth gap G4. Refer to FIG. 10. FIG. 10 is a schematic top view of the fourth embodiment of the upper adhesion member 8, the light guide plate 3, and the light emitting unit 2. In some embodiments, the upper adhesion member 8 and the lower adhesion member 9 discontinuously surround the light emitting unit 2, but are not limited thereto. In some other embodiments, the upper adhesion member 8 and the lower adhesion member 9 continuously surround the light emitting unit 2. The upper adhesion member 8 and the lower adhesion member 9 are close to the light emitting unit 2 on the axis B, so that the light from the first light emitting unit 21, the third light emitting unit 23, and the second light emitting unit 22 is mixed in advance, and the mixed light is reflected into the light guide plate 3 through the light reflecting area 422 of the film 4 and the reflection portion 5.

Refer to FIG. 7. In some embodiments, the upper adhesion member 8 and the lower adhesion member 9 are optical adhesive layers.

Figure 11:
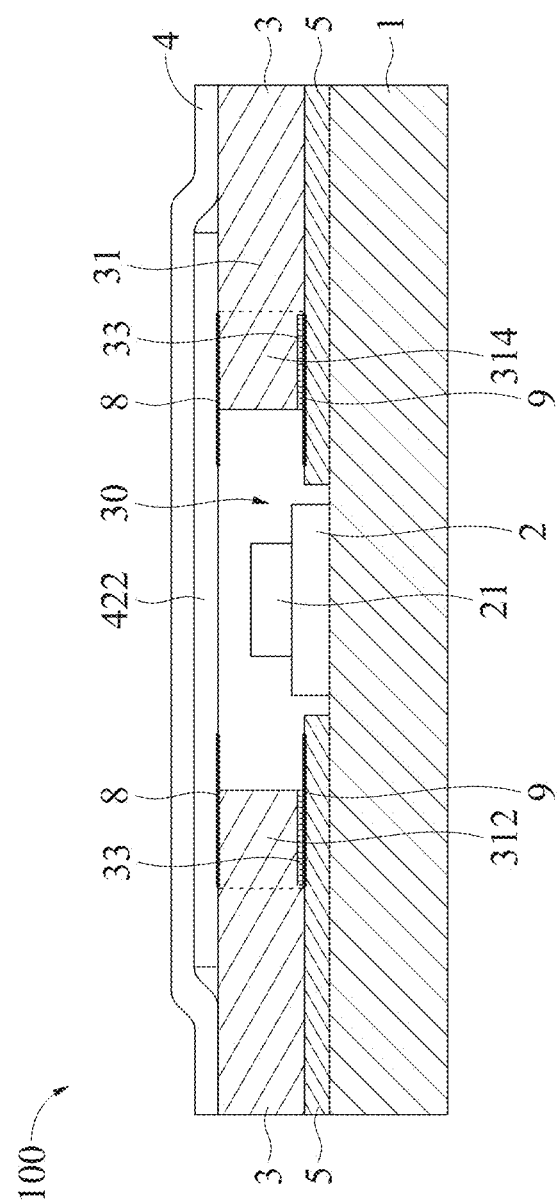
FIG. 11 is a schematic sectional view of a fifth embodiment of alight guide module.

Refer to FIG. 11. FIG. 11 is a schematic sectional view of a fifth embodiment of the light guide module 100. In some embodiments, on the axis B, a microstructure area 33 is arranged on the light conducting area 31 around the through hole 30. In some embodiments, the light conducting area 31 around the through hole 30 includes the first sub-light conducting area 311, the second sub-light conducting area 312, the third sub-light conducting area 313, and the fourth sub-light conducting area 314. The microstructure area 33 is arranged on the second sub-light conducting area 312 and the fourth sub-light conducting area 314. In some embodiments, the microstructure area 33 is arranged above the lower adhesion member 9. In some embodiments, the microstructure area 33 is gridlines. The microstructure area 33 is arranged on the axis B, so that after light emitted by the first light emitting unit 21, the third light emitting unit 23, and the second light emitting unit 22 enters the light guide plate 3, the microstructure area 33 can destroy total internal reflection of the light emitted by the light emitting unit 2. Also, the light reflecting area 422 of the film 4 and the reflection portion 5 retain light energy in the light guide plate 3, so that a light energy loss can be significantly reduced and a light mixing effect can be achieved.

In some embodiments, when there is a requirement for light uniformity over a large area, the light guide module 100 further includes a second light emitting unit 2'. In some embodiments, the light guide module 100 includes two or more light emitting units 2. Possible embodiments of multiple light emitting units are respectively described below.

Figure 12:
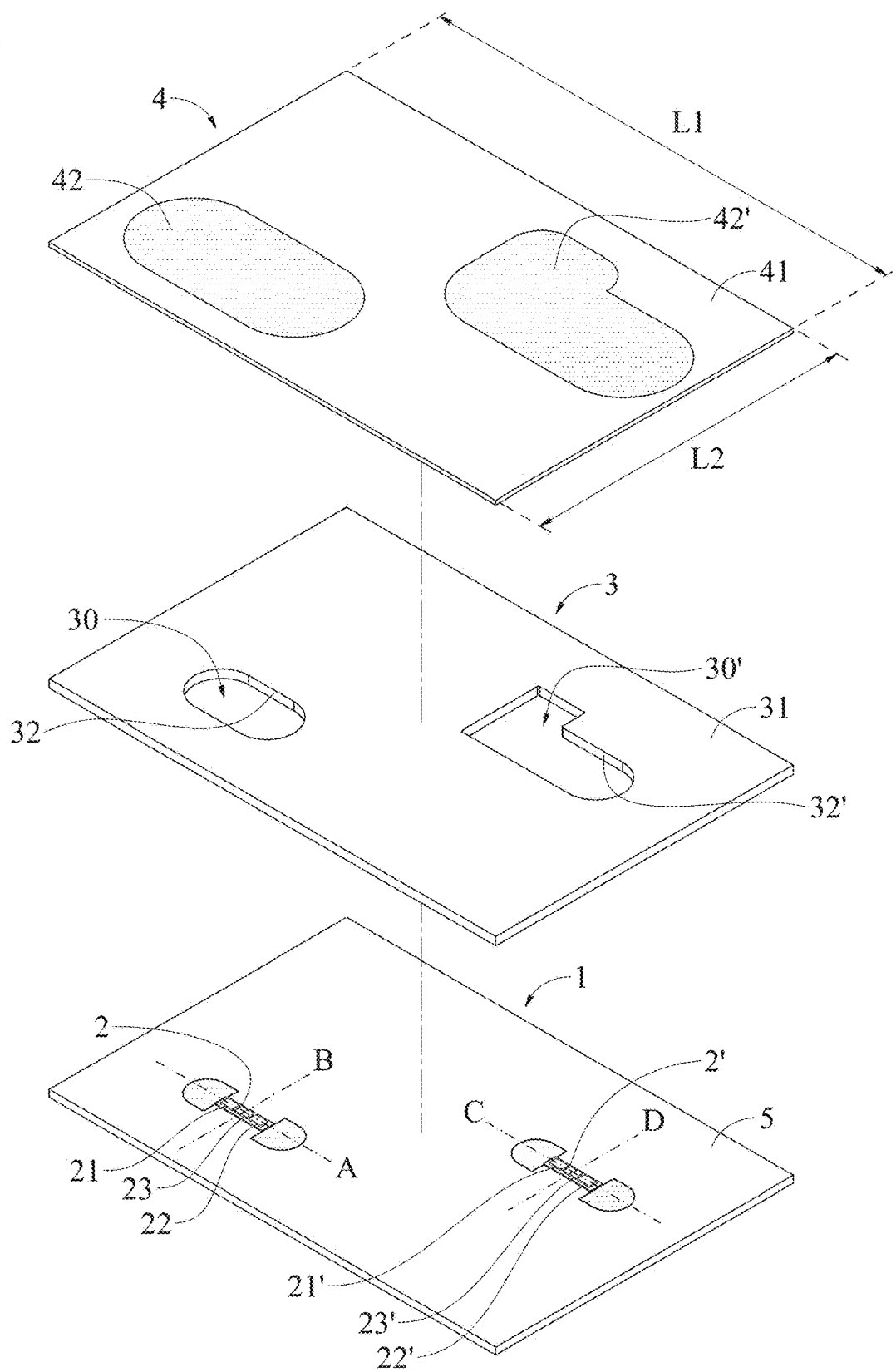
FIG. 12 is a schematic front three-dimensional exploded view of a sixth embodiment of a light guide module.
Figure 13:
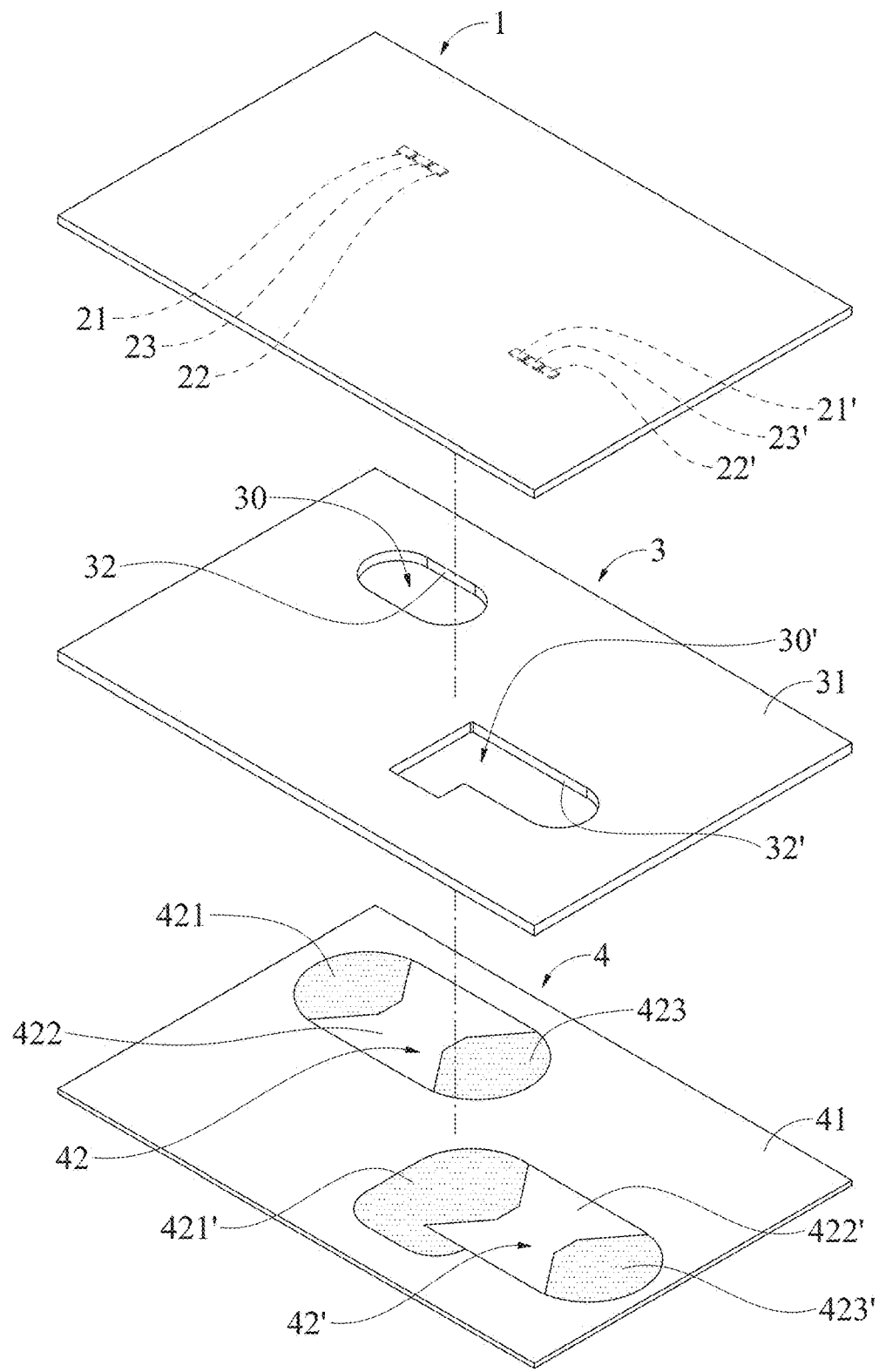
FIG. 13 is a schematic back three-dimensional exploded view of a sixth embodiment of a light guide module.

Refer to FIG. 12 and FIG. 13. FIG. 12 and FIG. 13 are schematic front and back three-dimensional exploded views of a sixth embodiment of the light guide module 100. A structure of the light guide module 100 of the sixth embodiment is approximately the same as that of the first embodiment. The light guide module 100 further includes a second light emitting unit 2'. The second light emitting unit 2' includes a fourth light emitting unit 21' and a fifth light emitting unit 22'. The fourth light emitting unit 21' and the fifth light emitting unit 22' are arranged on the circuit board 1 along an axis C. The second light emitting unit 2' has an axis D, and the axis D is substantially perpendicular to the axis C. The light guide plate 3 further has a second through hole 30' corresponding to the second light emitting unit 2'. The second through hole 30' is surrounded by a second hole wall 32'. The second light emitting unit 2' is located in the second through hole 30'. The film 4 further has a second light adjusting portion 42' corresponding to the second through hole 30'. The second light adjusting portion 42' is located in the light transmitting area 41. In some embodiments, both the axis C and the axis D pass through the second light emitting unit 2'.

Refer to FIG. 12. In some embodiments, a first light emitting unit 2 further includes the third light emitting unit 23. The first light emitting unit 21, the third light emitting unit 23, and the second light emitting unit 22 are sequentially arranged along the axis A. The second light emitting unit 2' further includes a sixth light emitting unit 23'. The fourth light emitting unit 21', the sixth light emitting unit 23', and the fifth light emitting unit 22' are sequentially arranged along the axis C.

Figure 14:
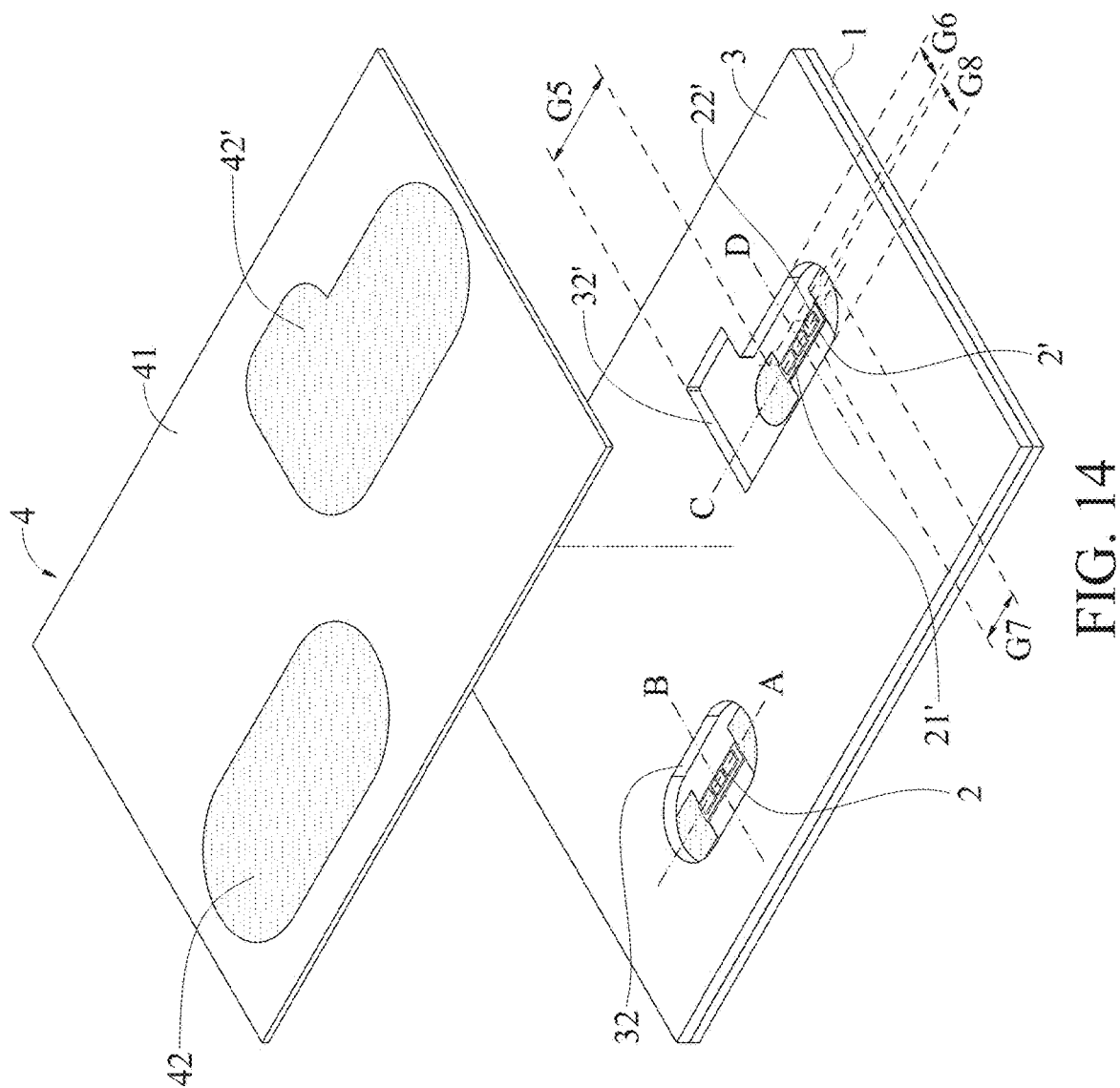
FIG. 14 is a schematic partial front three-dimensional exploded view of a sixth embodiment of a light guide module.

Refer to FIG. 14. FIG. 14 is a schematic partial front three-dimensional exploded view of the sixth embodiment of the light guide module 100. There is a fifth gap G5 between the fourth light emitting unit 21' and the adjacent second hole wall 32' along the axis C, and there is a sixth gap G6 between the fourth light emitting unit 21' and the adjacent second hole wall 32' along the axis D. The fifth gap G5 is larger than the sixth gap G6. In some embodiments, there is a seventh gap G7 between the fifth light emitting unit 22' and the adjacent second hole wall 32' along the axis C, and there is an eighth gap G8 between the fifth light emitting unit 22' and the adjacent second hole wall 32' along the axis D. The seventh gap G7 is larger than the eighth gap G8.

In addition, refer to FIG. 2. In some embodiments, there is a first gap G1 between the first light emitting unit 21 and an adjacent first hole wall 32 along the axis A, and there is a second gap G2 between the first light emitting unit 21 and the adjacent first hole wall 32 along an axis B. The first gap G1 is larger than the second gap G2. In some embodiments, there is a third gap G3 between the second light emitting unit 22 and the adjacent first hole wall 32 along the axis A, and there is a fourth gap G4 between the second light emitting unit 22 and the adjacent first hole wall 32 along the axis B. The third gap G3 is larger than the fourth gap G4.

Figure 15:
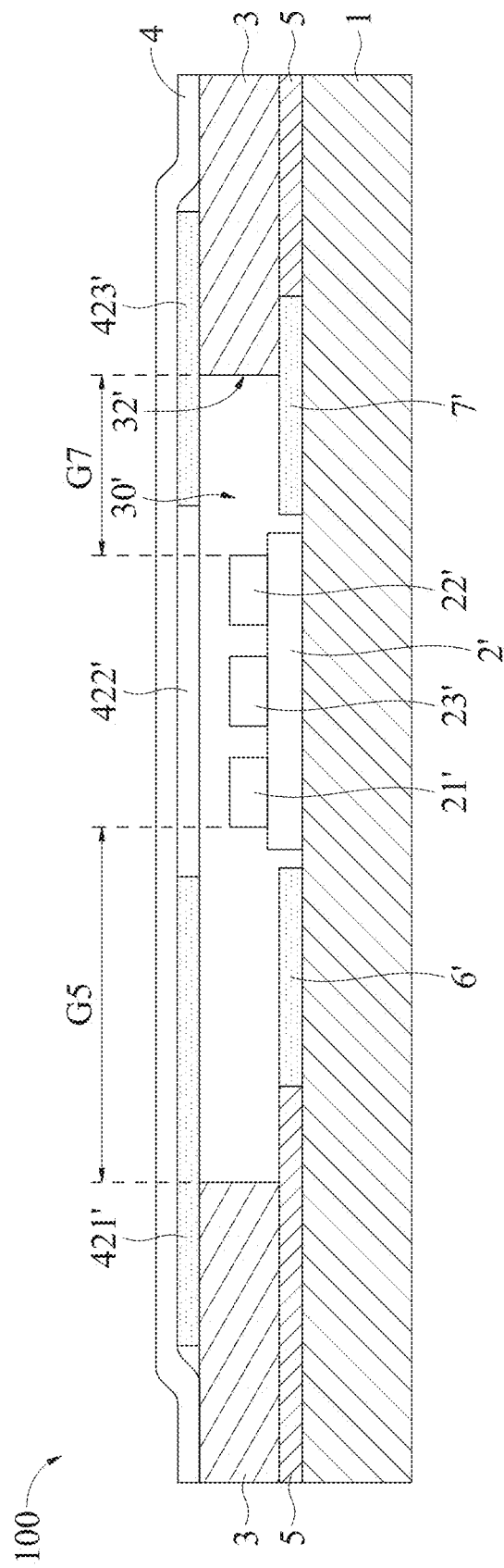
FIG. 15 is a schematic sectional view of a sixth embodiment of a light guide module.
Figure 16:
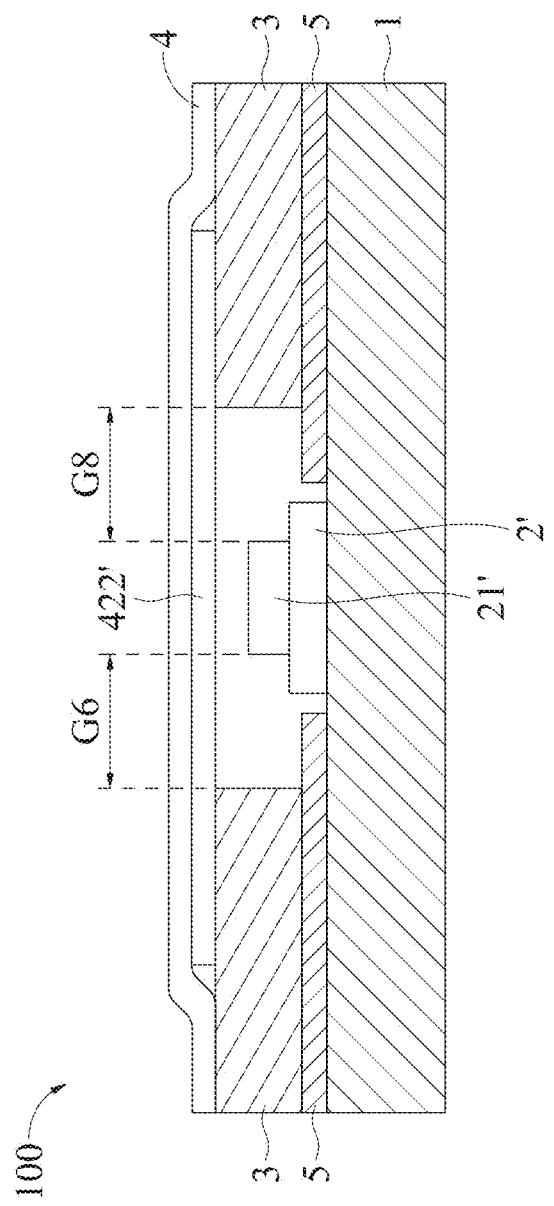
FIG. 16 is a schematic sectional view of a sixth embodiment of a light guide module.

Refer to FIG. 13. In some embodiments, a first light adjusting portion 42 includes a first light shielding area 421 and a first light reflecting area 422. The second light adjusting portion 42' includes a third light shielding area 421' and a second light reflecting area 422'. In addition, refer to FIG. 15 and FIG. 16. FIG. 15 and FIG. 16 are schematic sectional views of the sixth embodiment of the light guide module 100. The second light reflecting area 422' corresponds to the second light emitting unit 2' and the sixth gap G6, and the third light shielding area 421' corresponds to the fifth gap G5. The first light reflecting area 422 corresponds to the first light emitting unit 2 and the second gap G2, and the first light shielding area 421 corresponds to the first gap G1 (also referring to FIG. 4 and FIG. 5). In some embodiments, the second light adjusting portion 42' further includes a fourth light shielding area 423', the fourth light shielding area 423' corresponds to the seventh gap G7, and the second light reflecting area 422' further corresponds to the eighth gap G8. The first light adjusting portion 42 further includes a second light shielding area 423, the second light shielding area 423 corresponds to the third gap G3, and the first light reflecting area 422 further corresponds to the fourth gap G4 (also referring to FIG. 4 and FIG. 5).

Refer to FIG. 15. In some embodiments, the light guide module 100 further includes a third light absorption area 6'" and a fourth light absorption area 7'. The third light absorption area 6' and the fourth light absorption area 7' are arranged on the circuit board 1. In some embodiments, the third light absorption area 6' corresponds to the fifth gap G5. In some embodiments, the fourth light absorption area 7' corresponds to the seventh gap G7.

Refer to FIG. 12. In some embodiments, a long side length L1 of the film 4 is greater than a short side length L2 of the film 4, the axis A of the first light emitting unit 2 is parallel to the axis C of the second light emitting unit 2', and the axis B of the first light emitting unit 2 is parallel to and does not overlap the axis D of the second light emitting unit 2'. In some embodiments, the axis A of the first light emitting unit 2 is parallel to and does not overlap the axis C of the second light emitting unit 2'. In some embodiments, the long side length L1 of the film 4 is greater than or equal to twice the short side length L2 of the film 4.

Figure 17:
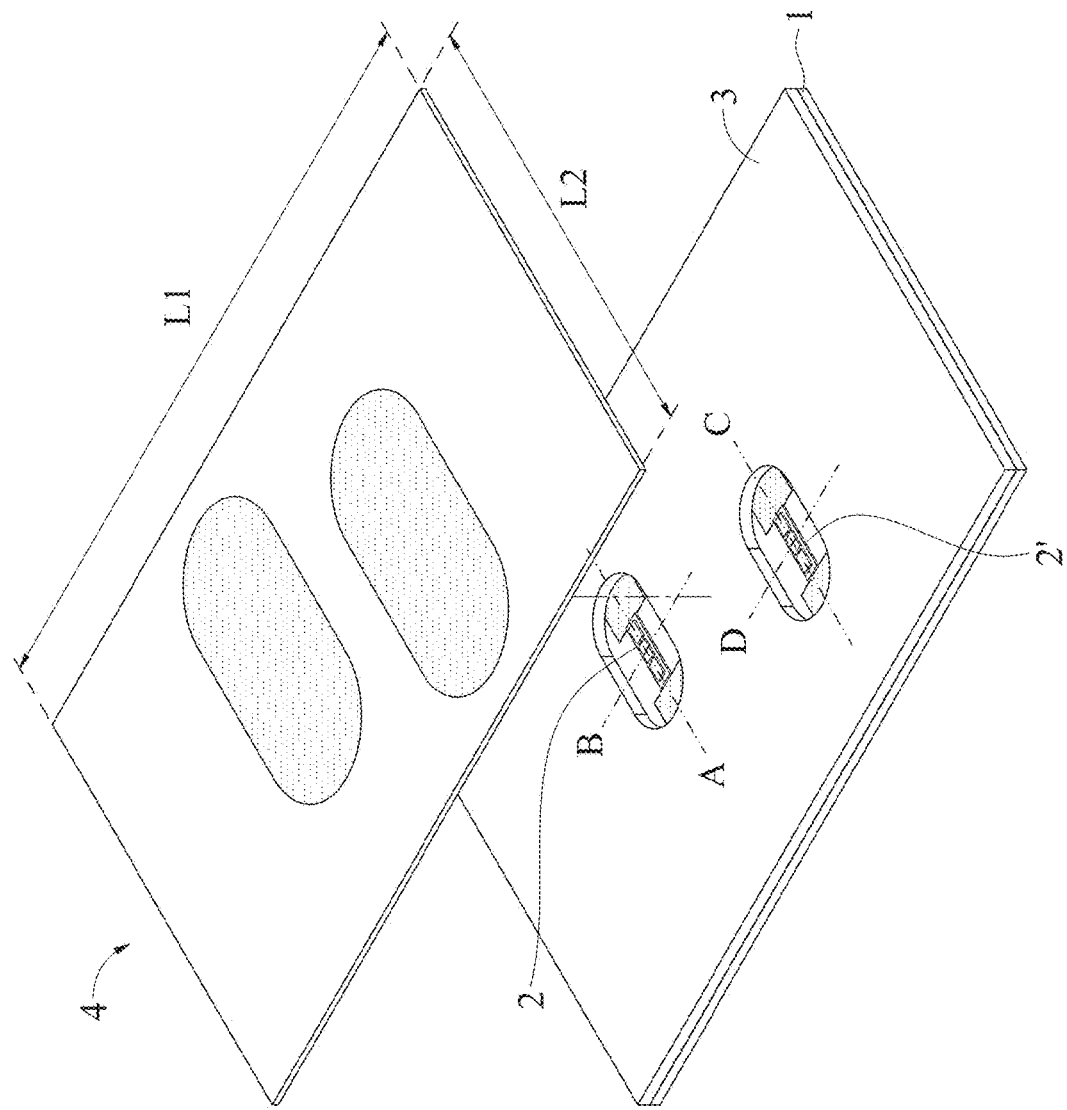
FIG. 17 is a schematic partial front three-dimensional exploded view of a seventh embodiment of a light guide module.

Refer to FIG. 12. In addition, refer to FIG. 17. FIG. 17 is a schematic partial front three-dimensional exploded view of a seventh embodiment of the light guide module 100. The axis A and the axis C in the sixth embodiment are parallel to a direction of the long side length L1 of the film 4, and the axis A and the axis C in the seventh embodiment are parallel to a direction of the short side length L2 of the film 4.

Refer to FIG. 12. In some embodiments, the second through hole 30' is L-shaped. By using the L-shaped second through hole 30' as a light blocking portion, light emitted by the first light emitting unit 2 can be blocked, thereby avoiding a heterochromatic problem caused by the first light emitting unit 2, and improving a light uniformity of the light guide module 100. Refer to FIG. 17. In some embodiments, the second through hole 30' is elliptical.

Refer to FIG. 13. In some embodiments, to cooperate with the L-shaped second through hole 30', a range of the third light shielding area 421' of the second light adjusting portion 42' arranged above the second through hole 30' is larger than a range of the fourth light shielding area 423', to cover the second through hole 30'. In some embodiments, the first light adjusting portion 42 completely covers the first through hole 30 to avoid light leakage. In some embodiments, the second light adjusting portion 42' completely covers the second through hole 30' to avoid light leakage.

Figure 18:
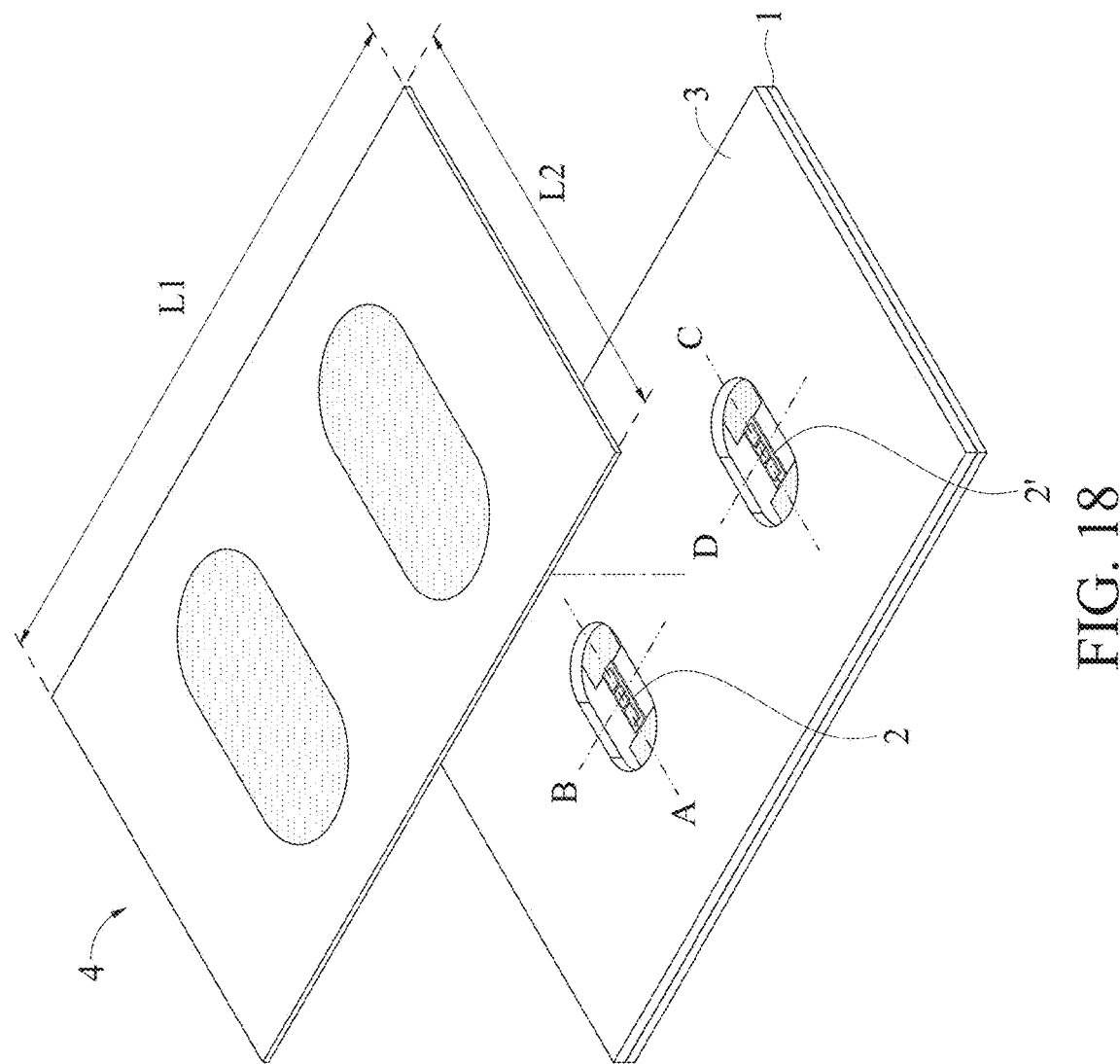
FIG. 18 is a schematic partial front three-dimensional exploded view of an eighth embodiment of a light guide module.

Refer to FIG. 18. FIG. 18 is a schematic partial front three-dimensional exploded view of an eighth embodiment of the light guide module 100. The axis A of the first light emitting unit 2 is parallel to and does not overlap the axis C of the second light emitting unit 2', and the axis B of the first light emitting unit 2 is parallel to and overlaps the axis D of the second light emitting unit 2'.

Figure 19:
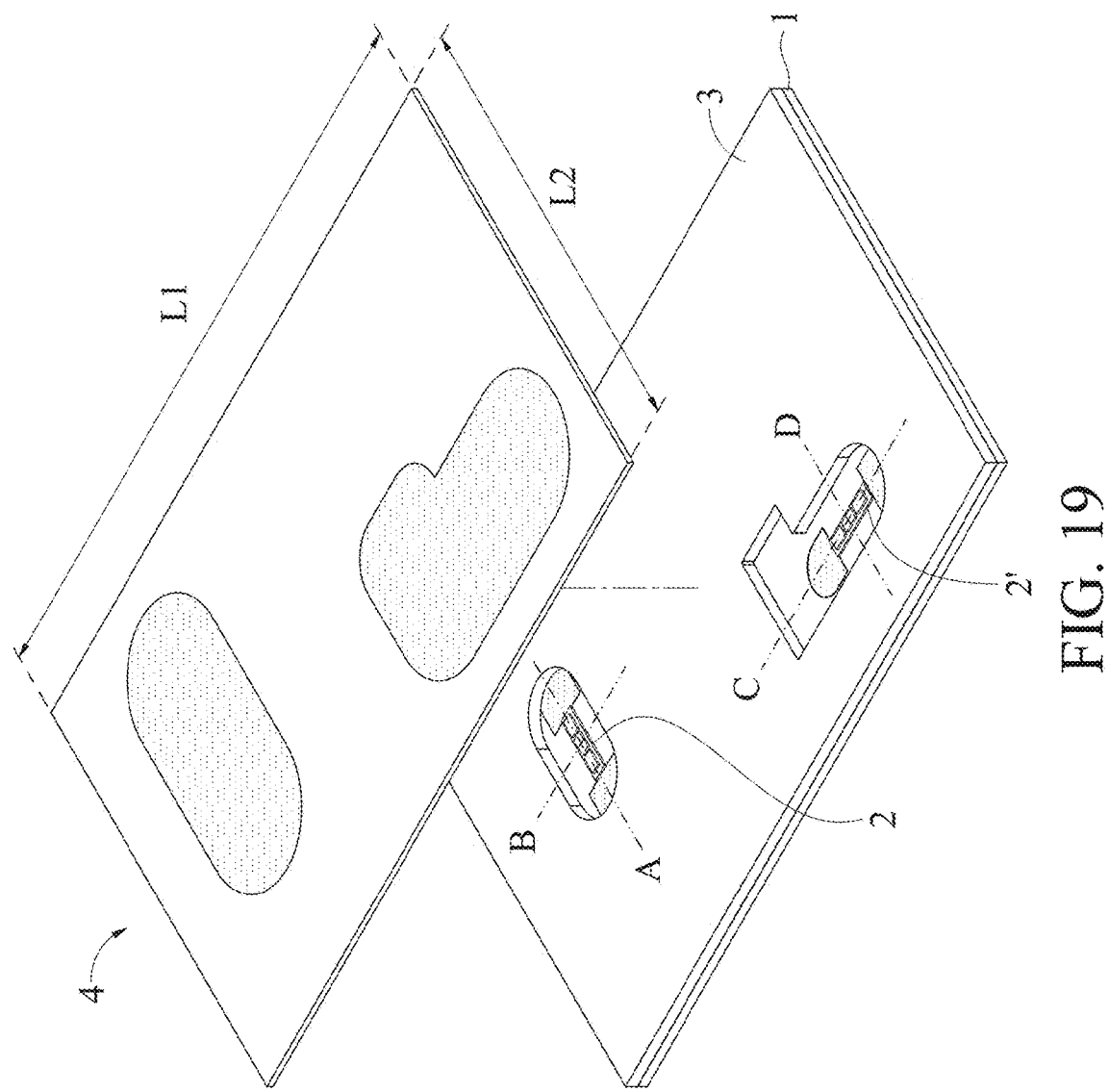
FIG. 19 is a schematic partial front three-dimensional exploded view of a ninth embodiment of a light guide module.

Refer to FIG. 19. FIG. 19 is a schematic partial front three-dimensional exploded view of a ninth embodiment of the light guide module 100. The long side length L1 of the film 4 is greater than the short side length L2 of the film 4, and the axis A of the first light emitting unit 2 is perpendicular to the axis C of the second light emitting unit 2'. In some embodiments, the axis A of the first light emitting unit 2 is parallel to and does not overlap the axis D of the second light emitting unit 2'. In some embodiments, the axis B of the first light emitting unit 2 is parallel to and does not overlap the axis C of the second light emitting unit 2', and the axis B of the first light emitting unit 2 is perpendicular to the axis D of the second light emitting unit 2'. In some embodiments, the long side length L1 of the film 4 is greater than or equal to twice the short side length L2 of the film 4.

Figure 20:
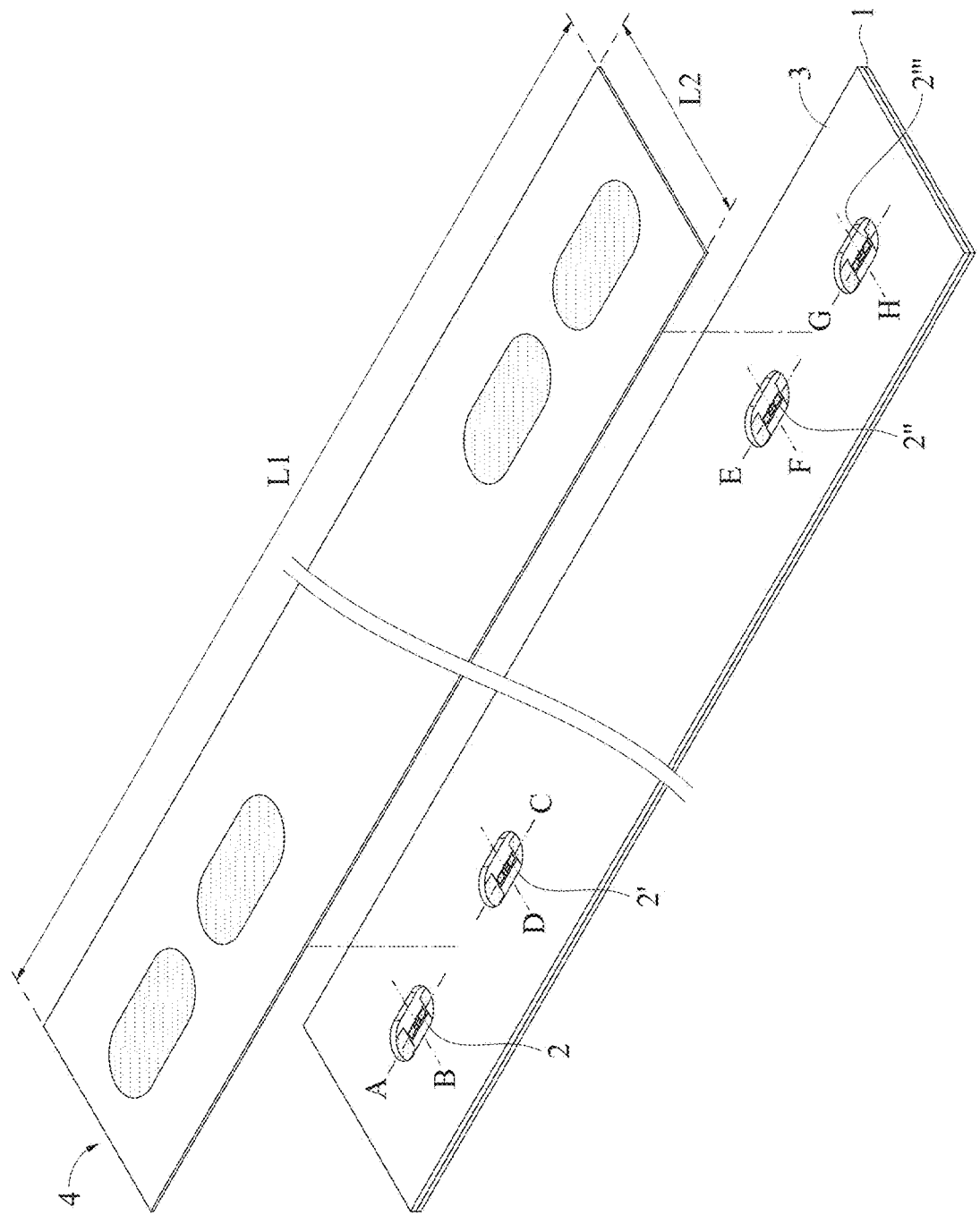
FIG. 20 is a schematic partial front three-dimensional exploded view of a tenth embodiment of a light guide module.

Refer to FIG. 20. FIG. 20 is a schematic partial front three-dimensional exploded view of a tenth embodiment of the light guide module 100. The long side length L1 of the film 4 is greater than four times the short side length L2 of the film 4, and the axis A of the first light emitting unit 2 overlaps the axis C of the second light emitting unit 2'. In some embodiments, the axis B of the first light emitting unit 2 is parallel to and does not overlap the axis D of the second light emitting unit 2'. In some embodiments, the light guide module 100 further includes a third light emitting unit 2" and a fourth light emitting unit 2'''. In some embodiments, the axis A of the first light emitting unit 2 overlaps the axis C of the second light emitting unit 2', an axis E of the third light emitting unit 2", and an axis G of the fourth light emitting unit 2'''. In some embodiments, the axis B of the first light emitting unit 2 is parallel to and does not overlap the axis D of the second light emitting unit 2', an axis F of the third light emitting unit 2", and an axis H of the fourth light emitting unit 2'''.

Therefore, according to some embodiments, in a light guide module, a distance for emitting light from both left and right sides of a light emitting unit to a light guide plate on a first axis is increased, to weaken optical coupling efficiency, and avoid high monochrome light energy on both the left and right sides, thereby alleviating a heterochromatic problem and improving a light uniformity.

What is claimed is:

1. A light guide module, comprising:
    a circuit board;
    a light emitting unit, comprising a first light emitting unit and a second light emitting unit, wherein the first light emitting unit and the second light emitting unit are arranged on the circuit board along a first axis, the light emitting unit has a second axis, and the second axis is substantially perpendicular to the first axis;
    a light guide plate, having a through hole and a light conducting area, wherein the through hole is surrounded by a hole wall, the light guide plate is located on the circuit board and the light emitting unit is located in the through hole, there is a first gap between the first light emitting unit and the adjacent hole wall along the first axis, there is a second gap between the first light emitting unit and the adjacent hole wall along the second axis, and the first gap is larger than the second gap, there is a fourth gap between the second light emitting unit and the adjacent hole wall along the second axis, wherein on the second axis, the light conducting area around the through hole comprises a second sub-light conducting area and a fourth sub-light conducting area;
    a film, having a light transmitting area and a light adjusting portion, wherein the light adjusting portion is located in the light transmitting area, the light conducting area corresponds to the light transmitting area, and the through hole corresponds to the light adjusting portion;
    a lower adhesion member, arranged under the light guide plate and arranged around the light emitting unit; and
    a microstructure area, arranged on the second sub-light conducting area adjacent to the second gap and the fourth sub-light conducting area adjacent to the fourth gap, wherein the microstructure area is arranged above the lower adhesion member.

2. The light guide module according to claim 1, wherein the light adjusting portion comprises a first light shielding area and a light reflecting area, the light reflecting area corresponds to the light emitting unit and the second gap, and the first light shielding area corresponds to the first gap.

3. The light guide module according to claim 2, wherein the light emitting unit further comprises a third light emitting unit, and the first light emitting unit, the third light emitting unit, and the second light emitting unit are sequentially arranged along the first axis; there is a third gap between the second light emitting unit and the adjacent hole wall along the first axis, and the third gap is larger than the fourth gap; and the light adjusting portion further comprises a second light shielding area, the second light shielding area corresponds to the third gap, and the light reflecting area further corresponds to the fourth gap.

4. The light guide module according to claim 3, further comprising:
    an upper adhesion member, arranged on the light guide plate and arranged around the light emitting unit, wherein the upper adhesion member corresponds to the first gap and the third gap.

5. The light guide module according to claim 4,
    wherein the lower adhesion member corresponds to the first gap and the third gap.

6. The light guide module according to claim 5, wherein the upper adhesion member and the lower adhesion member continuously or discontinuously surround the light emitting unit.

7. The light guide module according to claim 4, wherein the light conducting area comprises a first sub-light conducting area and a third sub-light conducting area, and the upper adhesion member further corresponds to the first sub-light conducting area adjacent to the first gap and the third sub-light conducting area adjacent to the third gap.

8. The light guide module according to claim 4, wherein the upper adhesion member further corresponds to the second gap and the fourth gap.

9. The light guide module according to claim 1, further comprising:
a reflection portion, arranged between the light guide plate and the circuit board; and
a first light absorption area and a second light absorption area, arranged on the circuit board, wherein the first light absorption area corresponds to the first gap.

10. The light guide module according to claim 9, wherein the light conducting area comprises a first sub-light conducting area and a third sub-light conducting area, and the first light absorption area further corresponds to the first sub-light conducting area adjacent to the first gap.

11. The light guide module according to claim 1, further comprising:
a reflection portion, arranged between the light guide plate and the circuit board; and
a first light absorption area and a second light absorption area, being a part of the circuit board, wherein the first light absorption area corresponds to the first gap.

12. A light guide module, comprising:
a circuit board;
a first light emitting unit, comprising a first light emitting unit and a second light emitting unit, wherein the first light emitting unit and the second light emitting unit are arranged on the circuit board along a first axis, the first light emitting unit has a second axis, and the second axis is substantially perpendicular to the first axis;
a second light emitting unit, comprising a fourth light emitting unit and a fifth light emitting unit, wherein the fourth light emitting unit and the fifth light emitting unit are arranged on the circuit board along a third axis, the second light emitting unit has a fourth axis, and the fourth axis is substantially perpendicular to the third axis;
a light guide plate, having a first through hole, a second through hole, and a light conducting area, wherein the first through hole is surrounded by a first hole wall, the second through hole is surrounded by a second hole wall, and the light guide plate is located on the circuit board and the first light emitting unit is located in the first through hole; there is a first gap between the first light emitting unit and the adjacent first hole wall along the first axis, there is a second gap between the first light emitting unit and the adjacent first hole wall along the second axis, and the first gap is larger than the second gap; the second light emitting unit is located in the second through hole; and there is a fifth gap between the fourth light emitting unit and the adjacent second hole wall along the third axis, there is a sixth gap between the fourth light emitting unit and the adjacent second hole wall along the fourth axis, and the fifth gap is larger than the sixth gap, and there is a fourth gap between the second light emitting unit and the adjacent first hole wall along the second axis, wherein on the second axis, the light conducting area around the through hole comprises a second sub-light conducting area and a fourth sub-light conducting area;
a film, having a light transmitting area, a first light adjusting portion, and a second light adjusting portion, wherein the first light adjusting portion and the second light adjusting portion are located in the light transmitting area, the light conducting area corresponds to the light transmitting area, the first through hole corresponds to the first light adjusting portion, and the second through hole corresponds to the second light adjusting portion;
a lower adhesion member, arranged under the light guide plate and arranged around the light emitting unit; and
a microstructure area, arranged on the second sub-light conducting area adjacent to the second gap and the fourth sub-light conducting area adjacent to the fourth gap, wherein the microstructure area is arranged above the lower adhesion member.

13. The light guide module according to claim 12, wherein the first light adjusting portion comprises a first light shielding area and a first light reflecting area, the first light reflecting area corresponds to the first light emitting unit and the second gap, and the first light shielding area corresponding to the first gap.

14. The light guide module according to claim 13, wherein the first light emitting unit further comprises a third light emitting unit, and the first light emitting unit, the third light emitting unit, and the second light emitting unit are sequentially arranged along the first axis; there is a third gap between the second light emitting unit and the adjacent first hole wall along the first axis, and the third gap is larger than the fourth gap; and the first light adjusting portion further comprises a second light shielding area, the second light shielding area corresponds to the third gap, and the first light reflecting area further corresponds to the fourth gap.

15. The light guide module according to claim 12, wherein a long side length of the film is greater than a short side length of the film, and the first axis of the first light emitting unit is perpendicular to the third axis of the second light emitting unit.

16. The light guide module according to claim 12, wherein a long side length of the film is greater than a short side length of the film, the first axis of the first light emitting unit is parallel to the third axis of the second light emitting unit, and the second axis of the first light emitting unit is parallel to and does not overlap the fourth axis of the second light emitting unit.

17. The light guide module according to claim 12, wherein the second through hole is L-shaped.

18. The light guide module according to claim 12, wherein a long side length of the film is greater than four times a short side length of the film, and the first axis of the first light emitting unit overlaps the third axis of the second light emitting unit.

* * * * *